(12) United States Patent
Goll et al.

(10) Patent No.: US 8,499,464 B2
(45) Date of Patent: Aug. 6, 2013

(54) ANGLE SENSOR ARRANGEMENT

(75) Inventors: Manfred Goll, Glauburg 2 (DE);
Hilmar Müller, Heuchelheim (DE);
Udo Hilgenberg, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 277 days.

(21) Appl. No.: 13/057,016

(22) PCT Filed: Jul. 8, 2009

(86) PCT No.: PCT/EP2009/058693
§ 371 (c)(1),
(2), (4) Date: Feb. 1, 2011

(87) PCT Pub. No.: WO2010/015482
PCT Pub. Date: Feb. 11, 2010

(65) Prior Publication Data
US 2011/0131821 A1    Jun. 9, 2011

(30) Foreign Application Priority Data
Aug. 5, 2008  (DE) .......................... 10 2008 036 377

(51) Int. Cl.
*G01B 7/30* (2006.01)
*B62D 5/04* (2006.01)

(52) U.S. Cl.
USPC .......................................... 33/1 PT; 361/292

(58) Field of Classification Search
USPC .......................................... 33/1 PT; 361/292
See application file for complete search history.

(56) References Cited

U.S. PATENT DOCUMENTS

| | | | | |
|---|---|---|---|---|
| 2,246,928 A | * | 6/1941 | Schick | 333/221 |
| 3,950,679 A | * | 4/1976 | Boeren | 361/292 |
| 4,434,391 A | * | 2/1984 | Swartz et al. | 318/662 |
| 5,077,635 A | * | 12/1991 | Bollhagen et al. | 361/287 |
| 5,959,863 A | * | 9/1999 | Hoyt et al. | 700/85 |
| 6,334,257 B1 | * | 1/2002 | Den Ouden | 33/1 N |
| 6,449,853 B1 | | 9/2002 | Brueggemann | |
| 6,683,780 B2 | * | 1/2004 | Thomas et al. | 361/283.2 |
| 7,023,684 B1 | * | 4/2006 | Chen | 361/287 |
| 7,269,910 B2 | * | 9/2007 | Raab et al. | 33/503 |
| 7,415,896 B2 | | 8/2008 | Khoury et al. | |
| 7,420,376 B2 | * | 9/2008 | Tola et al. | 324/661 |
| 7,778,796 B2 | * | 8/2010 | Takano et al. | 702/151 |
| 2010/0194236 A1 | * | 8/2010 | Verkoglyad et al. | 310/308 |

FOREIGN PATENT DOCUMENTS

| | | |
|---|---|---|
| DE | 41 23 781 | 1/1993 |
| DE | 43 12 886 | 11/1994 |
| DE | 196 37 967 | 10/1997 |
| DE | 198 05 106 | 3/1999 |
| DE | 198 16 810 | 10/1999 |
| DE | 10 2005 010 909 | 9/2006 |

OTHER PUBLICATIONS

International Search Report for PCT/EP2009/058693 issued Sep. 29, 2009.

* cited by examiner

*Primary Examiner* — Christopher Fulton
(74) *Attorney, Agent, or Firm* — RatnerPrestia

(57) ABSTRACT

Method for detecting an angle of rotation of an angle sensor arrangement including at least one first element and one second element, which are designed and arranged such that they can be rotated relative to one another, and at least one capacitor element whose capacitance changes on the basis of the angle of rotation, the angle of rotation being detected or determined directly or indirectly on the basis of this capacitance of the capacitor element, the capacitor element having at least one first band, and the angle of rotation being detected or determined at least on the basis of the positioning of the first band.

14 Claims, 4 Drawing Sheets

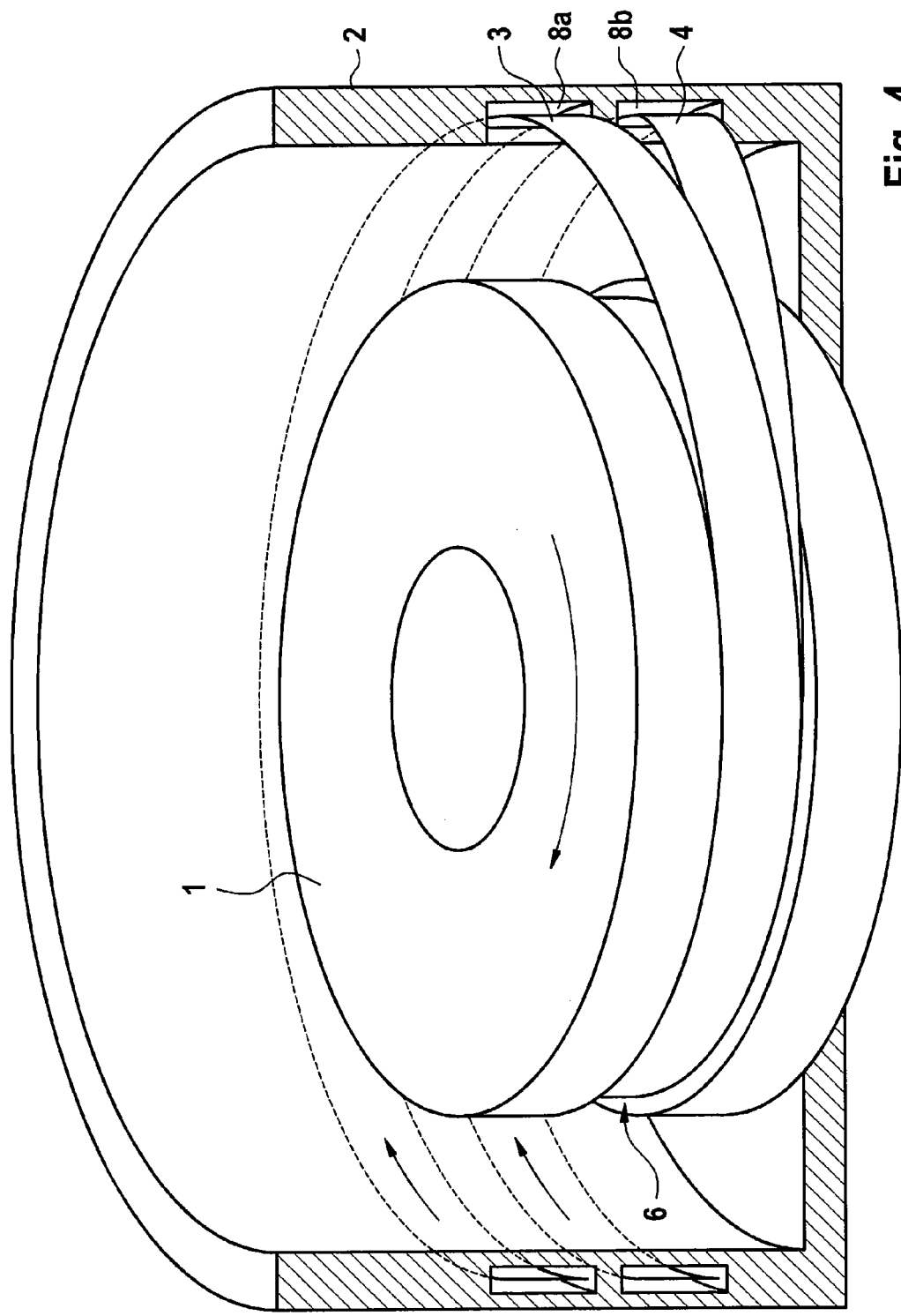

ANGLE SENSOR ARRANGEMENT

CROSS REFERENCE TO RELATED APPLICATIONS

This application is the U.S. national phase patent application of PCT International Application No. PCT/EP2009/058693, filed Jul. 8, 2009, which claims priority to German Patent Application No. DE 10 2008 036 377.4, filed Aug. 5, 2008, the contents of such applications being incorporated herein by reference.

FIELD OF THE INVENTION

The invention relates to a method for detecting an angle of rotation, to an angle sensor arrangement and to the use of the angle sensor arrangement in motor vehicles, in particular as a steering angle sensor arrangement.

BACKGROUND OF THE INVENTION

Angle sensors based on a capacitive measurement principle are known, as disclosed, for example, in the documents DE 10 2005 010 909 A1, DE 198 16 810 A1, DE 196 37 967 A1 and DE 43 13 886 A1, which are each incorporated by reference. Each of these comprises a capacitor element having two plates, which can be rotated relative to one another, as electrode elements.

SUMMARY OF THE INVENTION

An object of the present invention is to propose an angle sensor arrangement and a method for determining an angle of rotation, with which an angle of rotation can be measured in a relatively precise manner.

This object is achieved, according to aspects of the invention, by a method for detecting an angle of rotation of an angle sensor arrangement comprising at least one first element and one second element, which are designed and arranged such that they can be rotated relative to one another, and at least one capacitor element whose capacitance changes on the basis of the angle of rotation, the angle of rotation being detected or determined directly or indirectly on the basis of this capacitance of the capacitor element, wherein the capacitor element has at least one first band, the angle of rotation being detected or determined at least on the basis of the positioning of the first band. This object is also achieved, according to aspects of the invention, by an angle sensor arrangement comprising at least one first element and one second element, which are designed and arranged such that they can be rotated relative to one another, and at least one capacitor element whose capacitance changes on the basis of the angle of rotation, the angle of rotation being detected or determined directly or indirectly on the basis of this capacitance, wherein the capacitor element has at least one first band, the capacitance of the capacitor element changing on the basis of the positioning of the first band.

The invention relates to the concept of measuring an angle of rotation by directly or indirectly determining the capacitance of a capacitor element, the capacitor element comprising at least one first band whose position changes on the basis of the angle of rotation. In particular, the first band is connected to a drum element and to a housing element which are elements which can be rotated relative to one another and the relative angle of rotation of which is intended to be detected or measured. The relative orientation of the first band with respect to the drum element and/or the housing element and/ or an additional, second band particularly preferably changes during a relative rotational movement between the drum element and the housing element, as a result of which the capacitance of the capacitor element changes.

The first band is preferably a first electrode element of the capacitor element. The drum element or the housing element or a second band is in the form of a second electrode element of the capacitor element, in particular. The capacitance of the capacitor element particularly preferably depends at least on the relative orientation of the first and second electrode elements with respect to one another.

The angle sensor arrangement has the advantage that it can detect angles of rotation of more than 360° in a relatively simple manner. In this case, it is also possible to take into account changes in the angle of rotation which occur in an electrically inactive operating state of the angle sensor arrangement. This is also known by the term "true-power-on" functionality which is particularly desirable in the field of motor vehicle steering systems for detecting or taking into account changes in the steering angle which occur during inactive ignition of the motor vehicle. In addition, operation of the angle sensor arrangement is essentially free of noise and friction or has little noise and friction. There is no need for any gear elements in the angle sensor arrangement, for example.

The first element is preferably in the form of a rotor and the second element is in the form of a stator.

It is preferred for the first element to be in the form of a drum element and for the second element to be in the form of a housing element, and for the first band to be connected to the drum element and to the housing element and to be arranged such that, during a relative rotational movement between the drum element and the housing element, it is wound onto the drum element or unwound from the drum element, the housing element and/or the drum element and/or an additional, second band and the first band at least partially forming the capacitor element and being connected in an electrically conductive manner to an electronic evaluation circuit in which the capacitance of the capacitor element and/or at least one variable dependent on said capacitance is/are detected directly or indirectly, after which the angle of rotation between the drum element and the housing element is calculated or determined therefrom.

The drum element is preferably in the form of a rotor and the housing element is in the form of a stator. Alternatively, the housing element is preferably the rotor and the drum element is the stator.

The electronic evaluation circuit is preferably integrated in the angle sensor arrangement or alternatively is preferably in the form of an electronic control unit, in particular a separate electronic control unit.

The drum element and the housing element are each expediently rotatably mounted and can be rotated relative to one another.

The capacitance of the capacitor element preferably changes in a substantially linear manner with the length of the first band which has been rolled up or unrolled.

It is preferred for the relative angle of rotation to be calculated directly from at least one electrical variable of the capacitor element.

The capacitor element expediently additionally comprises at least one dielectric which is formed, for example, by a coating of the at least first band and/or by an air gap and/or by an additional separating layer or an additional, electrically insulating band.

The method is preferably supplemented with the fact that the angle sensor arrangement has the second band which is likewise connected to the drum element and to the housing element, the first and second bands each being designed and arranged such that they are at least partially electrically conductive and electrically insulated from one another, and the capacitance of the capacitor element being changed during a relative rotational movement between the drum element and the housing element by respectively winding the first and second bands onto the drum element or unwinding the bands from the drum element and in the process unrolling/removing the bands from the housing element or rolling/pushing the bands onto the latter, the first and second bands lying at least partially on top of one another and together forming the capacitor element.

It is preferred for electrically coded information to be transmitted at least via the first band which is electrically conductive.

It is preferred for the angle sensor arrangement to be designed in such a manner that the first element is in the form of a drum element and the second element is in the form of a housing element, and the first band is connected to the drum element and to the housing element and is arranged such that, during a relative rotational movement between the drum element and the housing element, it is wound onto the drum element or unwound from the drum element, the housing element and/or the drum element and/or an additional, second band and the first band at least partially forming a capacitor element and being connected in an electrically conductive manner to an electronic evaluation circuit in which the capacitance of the capacitor element and/or at least one variable dependent on said capacitance is/are detected or determined and the angle of rotation between the drum element and the housing element is calculated or determined directly or indirectly therefrom.

The angle sensor arrangement is preferably developed in such a manner that at least the first band is electrically conductive and connects an additional module fastened to the first element or drum element and/or a contact-making module, which, in particular, is in the form of a steering wheel with electronic components and/or is in the form of a contact-making module for making contact with the steering wheel, to the electronic evaluation circuit and/or to an additional electronic control unit, in particular the electronic control unit of a motor vehicle control system, particularly preferably a motor vehicle braking system, in an electrically conductive manner. This connection is expediently established using at least the first band and the second band.

A contact-making module for making contact with a steering wheel comprising a drum element, which is connected to the steering shaft and to the steering wheel, and a housing element, which is arranged in a stationary manner, is known. The drum element and the housing element are connected to one another using a plurality of ribbon cables in order to make electrical contact with the steering wheel, these ribbon cables being wound onto the drum element or unwound from the latter during a relative rotational movement between the drum element and the housing element. It is expedient to combine the angle sensor arrangement with this contact-making module and to integrate these two modules. In this case, at least the first band and the second band replace the ribbon cables and additionally attend to the function of the latter as a result of an electrically conductive design, as a result of which at least the first band can perform a dual function for determining the angle of rotation and for transmitting signals between an electronic evaluation circuit or an electronic control unit and the steering wheel. Alternatively, this combined angle sensor arrangement preferably has two additional bands or ribbon cables for exclusively making electrical contact with the contact-making module or the steering wheel.

The additional module expediently comprises a contact-making arrangement for a steering wheel.

The at least first band and, in particular, the second band and/or optionally further bands are preferably in the form of a flat band and/or a film conductor and/or a strip conductor and/or a flexible film and/or a flat spiral spring and/or a spring band and are particularly preferably in the form of a metal band, for example a copper band, which is embedded or molded in plastic.

The drum element is preferably arranged in the housing element and/or is at least partially surrounded by the latter.

Alternatively, the housing element is preferably at least partially arranged inside the drum element, the drum element rolling at least the first band onto its inner cover or inner lateral surface or unrolling the band therefrom. An outer or inner cover is preferably understood as meaning an outer or inner lateral surface.

The drum element and the housing element each preferably have at least one guide means for guiding the at least first band. In particular, the guide means is in the form of a circumferential groove or channel and/or at least one rail. The inner lateral surface of the housing element and the outer lateral surface of the drum element each particularly preferably have at least one guide means, two guide means which are spaced apart from one another very particularly preferably being formed at least on one of these lateral surfaces. The groove or the channel is expediently helical and/or the at least first band or the first and second bands is/are fastened obliquely with respect to a base area, for example the housing base, of the drum or housing element and is/are thereby unrolled/wound obliquely with respect to this base area, in particular.

It is preferred for the angle sensor arrangement to have the second band which is likewise connected to the drum element and to the housing element, the first and second bands each being designed and arranged such that that they are at least partially electrically conductive and electrically insulated from one another and form the capacitor element, the angle sensor arrangement being designed such that, during a relative rotational movement between the drum element and the housing element, the capacitance of the capacitor element is changed by respectively winding the first and second bands onto the drum element or unwinding the bands from the drum element and in the process unrolling/removing the bands from the housing element or rolling/pushing the bands onto the latter, the first band and the second band lying at least partially on top of one another. The angle sensor arrangement particularly preferably has an electrically insulating third band which acts as the dielectric of the capacitor element and is arranged between the first and second bands.

The drum element and/or the housing element preferably has/have at least one conductor track and/or electrode track as part of the capacitor element, on which track the first band at least partially lies.

One of the bands is expediently wider than the other and/or an additional electrode element of the drum and/or housing element is wider than at least the first band. This makes it possible to ensure with sufficient reliability that the overlapping area between the bands and/or between the first band and the housing or drum element essentially depends only on the unrolling length and thus the relative angle of rotation and not on manufacturing inaccuracies or an inaccurate orientation of the at least one band.

It is expedient for the capacitance of the capacitor element to be essentially determined by at least that region of the first and second bands in which the first and second bands lie at least partially on top of one another.

The first band and the second band are preferably each at least partially wound onto the outer cover of the drum element.

The drum element is preferably essentially cylindrical and is directly or indirectly fastened to a rotatably mounted shaft whose angle of rotation is intended to be detected, the housing element being arranged such that it is essentially contactless with respect to the shaft and is in the form of a stator or is stationary.

The angle sensor arrangement is integrated together with an additional module and/or a contact-making module, in particular a steering wheel contact-making module, in a common system, particularly preferably having a common housing. In this case, the housing is very particularly preferably formed at least partially by the housing element, for example in the form of a box. This integration is relatively cost-effective and space-saving.

An angle of rotation is preferably understood as meaning a relative angle of rotation and, in particular, an angle of rotation based on an angular range of more than 360°, which thus comprises the angle information within one revolution and the number of revolutions based on relative rotation between the drum element and the housing element.

The invention also relates to the use of the angle sensor arrangement in motor vehicles, in particular as a steering angle sensor arrangement.

The method according to aspects of the invention and the angle sensor arrangement according to aspects of the invention are preferably intended to be used as a steering angle sensor arrangement with an integrated steering wheel contact-making module since both "multi-turn" detection of the steering angle with absolute measurements and "true-power-on" functionality are enabled and the entire arrangement can be integrated together with a contact-making module in a relatively cost-effective and space-saving manner.

BRIEF DESCRIPTION OF THE DRAWINGS

The invention is best understood from the following detailed description when read in connection with the accompanying drawings. Included in the drawings are the following figures:

FIG. 4 shows an exemplary design of the housing element with two channels into which the two bands can be inserted or from which the two bands can be withdrawn.

DETAILED DESCRIPTION OF THE INVENTION

Figure 1:
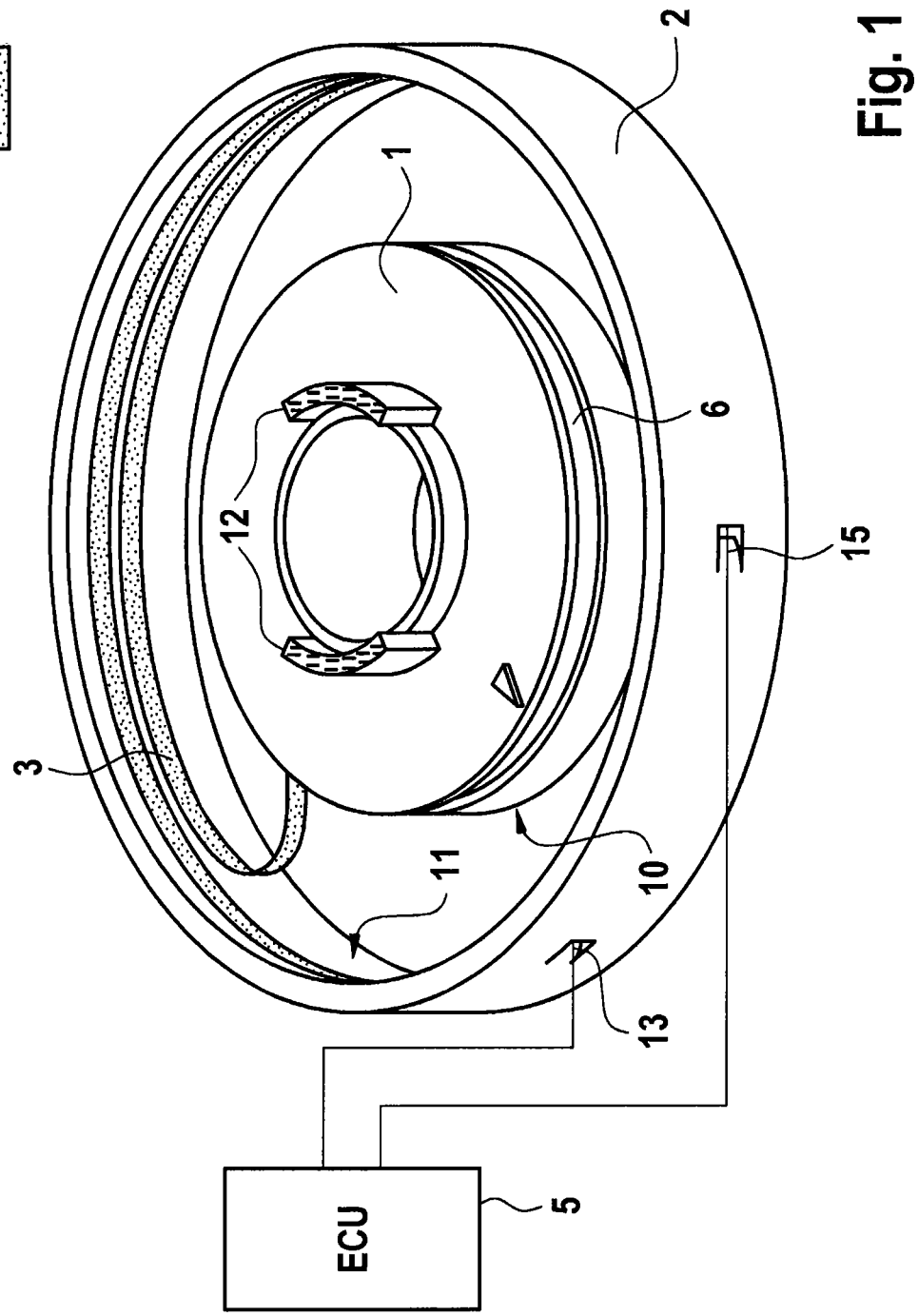
FIG. 1 shows an exemplary embodiment with a first band.

FIG. 1 illustrates an exemplary angle sensor arrangement comprising a housing element 2, which is permanently positioned, and a drum element 1 which is connected, in a manner not illustrated, to a shaft whose angle of rotation is intended to be detected and which is arranged such that it can be rotated relative to the housing element 2. A first band 3, for example in the form of a spring band or spring steel band, is connected to the drum element 1 and to the housing element 2 and is partially wound or rolled onto the outer cover 10 of the drum element 1 in a groove 6 as guide means. During a relative rotational movement between the drum element 1 and the housing element 2, the first band 3 is unrolled from the drum element 1 or rolled onto the latter and in the process is wound onto the inner cover 11 of the housing element 2 or unwound from the latter. In this case, a defined length of the first band 3 lies on the housing element 2, as a result of which the capacitance of a capacitor element consisting of the first band 3, the housing element 2 and an insulating layer (not illustrated) as dielectric is changed in a manner proportional to this length. The housing element 2 and the first band 3 are connected to a separate electronic control unit ECU as an electronic evaluation circuit 5 or comprising an electronic evaluation circuit in an electrically conductive manner via contact-making elements 13, 15. The relative angle of rotation between the drum element 1 and the housing element 2 is calculated in the ECU on the basis of the capacitance of the capacitor element. The drum element 1 is connected to an additional module or has an additional module comprising a contact-making arrangement 12 with connectors for making contact with a steering wheel. Power is supplied to the ECU and data are transmitted between the ECU and the steering wheel via the first band 3 and a second contact-making means (not illustrated), for example.

Figure 2:
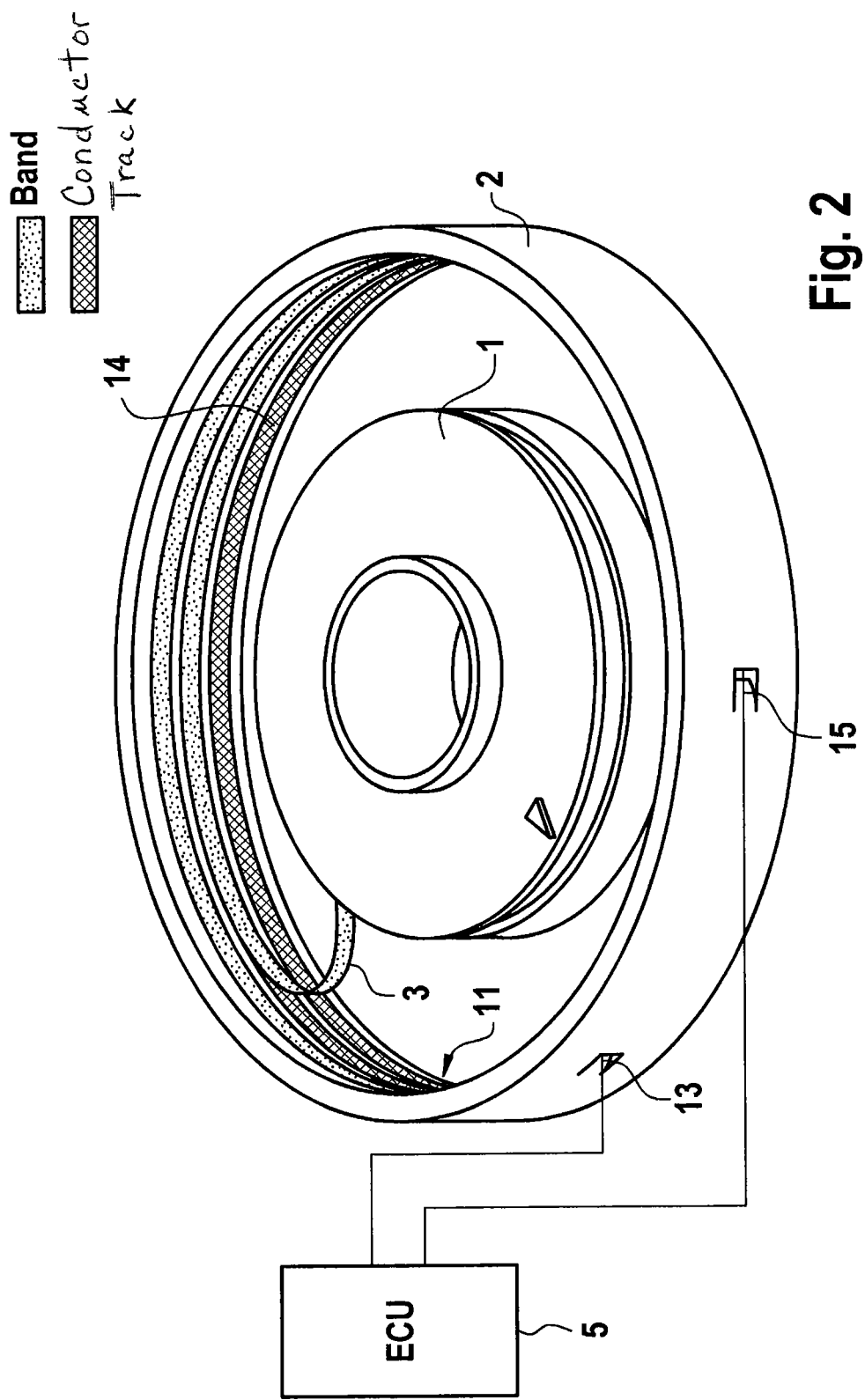
FIG. 2 shows an exemplary angle sensor arrangement having a conductor track as an electrode element on the inner cover of the housing element.

In the exemplary embodiment of an angle sensor arrangement illustrated in FIG. 2, the inner cover 11 of the housing element 2 has a conductor track 14 as an electrode element of the capacitor element, onto which track the first band 3 is rolled or from which the first band 3 is unrolled. The conductor track 14, for example in the form of a helically encircling metallization, and the first band 3 are electrically connected to the ECU 5, this connection comprising the contact-making elements 13 and 15. The relative angle of rotation between the drum element 1 and the housing element 2 is calculated in the ECU 5 on the basis of the capacitance of the capacitor element consisting of the first band 3, the conductor track 14 and the electrically insulating intermediate layer which is not illustrated and is, for example, a coating of the first band 3. This capacitance is proportional to the length of that part of the first band 3 which is unrolled from or lies on the conductor track 14.

In an exemplary embodiment which is not illustrated, the conductor track 14 is arranged in a helical groove through which the first band 3 is forcibly guided. Alternatively, the inner wall of the housing may be inclined and/or the band is not fastened parallel to the housing base of the housing element.

In another exemplary embodiment which is not illustrated, the first and second bands are jointly guided through the helical groove described above and are each fastened obliquely with respect to a base area or the housing base of the housing element.

Figure 3:
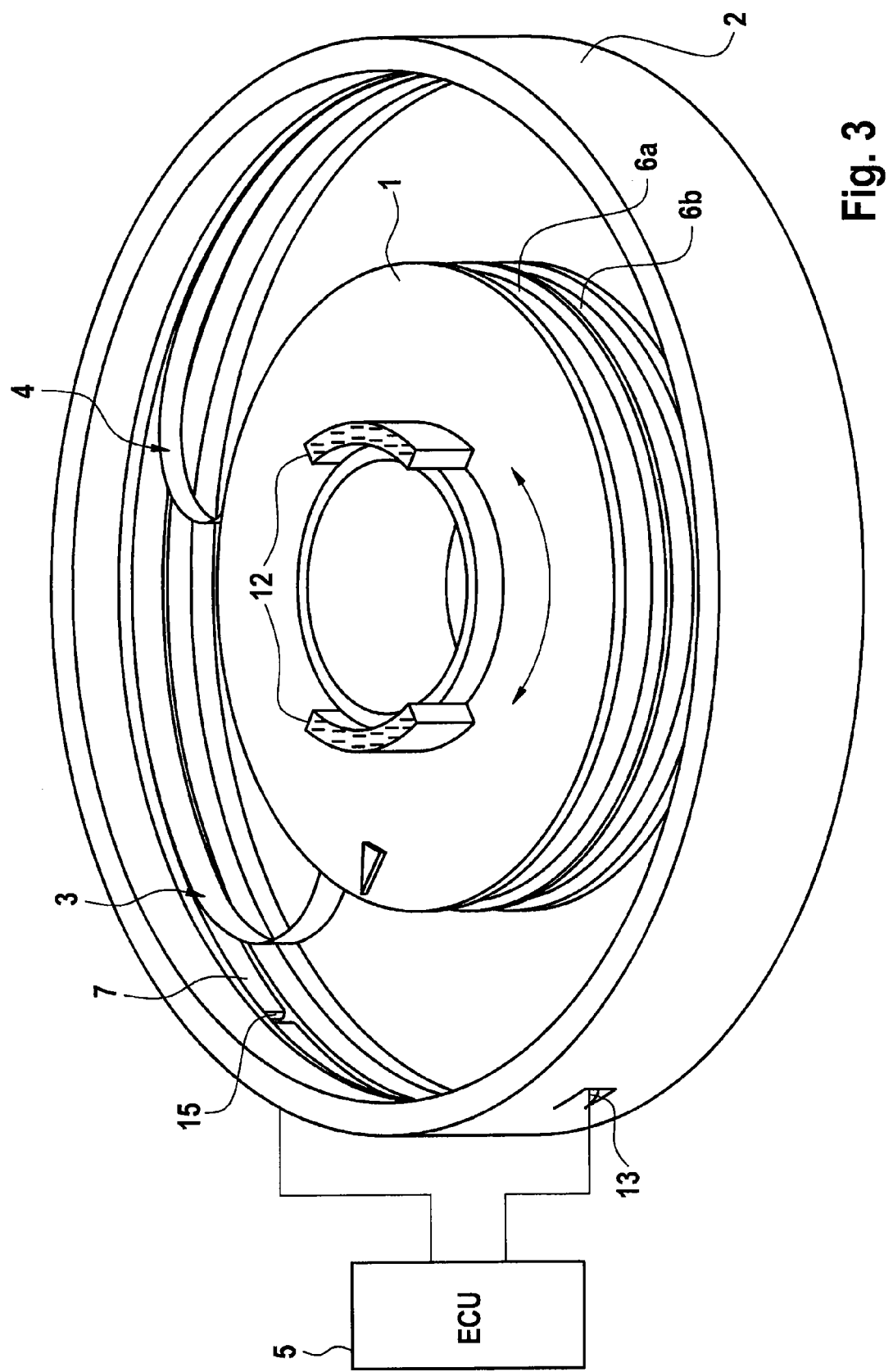
FIG. 3 shows an exemplary embodiment with a first band and a second band.

FIG. 3 shows an exemplary angle sensor arrangement having a first band 3 and a second band 4 which are partially rolled onto the drum element 1 in adjacent grooves 6a and 6b of the latter and are rolled or unrolled during a relative rotational movement or on the basis of the relative angle of rotation between the drum element 1 and the housing element 2. In this case, the second band 4 is placed or rolled onto the first band 3 in a groove 7 of the housing element 2 or is removed or unrolled therefrom in the opposite direction of rotation. The first and second bands 3, 4 and the electrical insulation between the latter form a capacitor element. The first and second bands 3, 4 are electrically connected to a separate electronic control unit ECU comprising an electronic evaluation circuit 5 via contact-making elements 13, 15. The drum element 1 has an additional module 12 with connectors for making contact with a steering wheel which is electrically connected to the ECU using the first and second bands 3 and 4. THE ECU calculates the relative angle of rotation between the drum element 1 and the housing element 2 on the basis of the capacitance of the capacitor element.

FIG. 4 illustrates an exemplary embodiment of an angle sensor arrangement, in which the housing element 2 has channels 8a, 8b into which the bands 3 and 4 are separately inserted or from which said bands are withdrawn during a rotational movement. In this case, the first and second bands 3, 4 lie on top of one another with a particular overlapping area or length, are electrically insulated from one another and are wound up in a groove 6 of the drum element 1. This overlapping area or length which depends on the respective relative angle of rotation between the drum element 1 and the housing element 2 is used to calculate this angle of rotation on the basis of the capacitance of the capacitor element formed by the bands 3, 4, which capacitance is proportional to the overlapping length.

The invention claimed is:

1. A method for detecting an angle of rotation of an angle sensor arrangement comprising at least one first element and one second element, which are configured to rotate relative to one another, and at least one capacitor element whose capacitance changes on the basis of the angle of rotation, the angle of rotation being detected or determined directly or indirectly on the basis of the capacitance of the capacitor element, wherein the capacitor element has at least one first band, the angle of rotation being detected or determined at least on the basis of a position of the first band, wherein electrically coded information is transmitted at least via the first band which is electrically conductive.

2. The method as claimed in claim 1, wherein the first element is in the form of a drum element and the second element is in the form of a housing element, and the first band is connected to the drum element and to the housing element and is arranged such that, during a relative rotational movement between the drum element and the housing element, the first band is wound onto the drum element or unwound from the drum element, the housing element and/or the drum element and/or an additional, second band, and wherein the first band at least partially forms the capacitor element and is connected in an electrically conductive manner to an electronic evaluation circuit (ECU) in which the capacitance of the capacitor element and/or at least one variable dependent on said capacitance is/are detected directly or indirectly, after which the angle of rotation between the drum element and the housing element is calculated or determined therefrom.

3. The method as claimed in claim 2, wherein the angle sensor arrangement includes the second band which is connected to the drum element and to the housing element, the first and second bands each being configured such that they are at least partially electrically conductive and electrically insulated from one another, and the capacitance of the capacitor element being changed during a relative rotational movement between the drum element and the housing element by respectively winding the first and second bands onto the drum element or unwinding the bands from the drum element, and, in the process, unrolling/removing the bands from the housing element or rolling/pushing the bands onto the housing element, the first and second bands lying at least partially on top of one another and together forming the capacitor element.

4. An angle sensor arrangement for carrying out the method as claimed in claim 1, comprising the at least one first element and one second element, which are configured to be rotated relative to one another, and the at least one capacitor element whose capacitance changes on the basis of the angle of rotation, the angle of rotation being detected or determined directly or indirectly on the basis of the capacitance, wherein the capacitor element has the at least one first band, the capacitance of the capacitor element changing on the basis of the positioning of the first band.

5. The angle sensor arrangement as claimed in claim 4, wherein the first element is in the form of a drum element and the second element is in the form of a housing element, and the first band is connected to the drum element and to the housing element and is arranged such that, during a relative rotational movement between the drum element and the housing element, the first band is wound onto the drum element or unwound from the drum element, the housing element and/or the drum element and/or an additional, second band, and wherein the first band at least partially forms a capacitor element and is connected in an electrically conductive manner to an electronic evaluation circuit (ECU) in which the capacitance of the capacitor element and/or at least one variable dependent on said capacitance is/are detected or determined and the angle of rotation between the drum element and the housing element is calculated or determined directly or indirectly therefrom.

6. The angle sensor arrangement as claimed in claim 5, wherein the drum element is arranged in the housing element and/or is at least partially surrounded by the housing element.

7. The angle sensor arrangement as claimed in claim 5, wherein the drum element and the housing element each have at least one guide means for guiding the at least one first band.

8. The angle sensor arrangement as claimed in claim 5, wherein the angle sensor arrangement includes the second band which is connected to the drum element and to the housing element, the first and second bands each being configured such that that they are at least partially electrically conductive and electrically insulated from one another and form the capacitor element, wherein the angle sensor arrangement is configured such that, during a relative rotational movement between the drum element and the housing element, the capacitance of the capacitor element is changed by respectively winding the first and second bands onto the drum element or unwinding the bands from the drum element, and, in the process, unrolling/removing the bands from the housing element or rolling/pushing the bands onto the latter, the first band and the second band lying at least partially on top of one another.

9. The angle sensor arrangement as claimed in claim 8, wherein the capacitance of the capacitor element is substantially determined by at least a region of the first and second bands in which the first and second bands lie at least partially on top of one another.

10. The angle sensor arrangement as claimed in claim 8, wherein the first band and the second band are each at least partially wound onto an outer cover of the drum element.

11. The angle sensor arrangement as claimed in claim 5, wherein the drum element is substantially cylindrical and is directly or indirectly fastened to a rotatably mounted shaft whose angle of rotation is configured to be detected, and wherein the housing element is arranged such that it is substantially contactless with respect to the shaft and is in the form of a stator.

12. The angle sensor arrangement as claimed in claim 4, wherein at least the first band is electrically conductive and connects an additional module fastened to the first element and/or a contact-making module to the electronic evaluation circuit and/or to an additional electronic control unit (ECU) in an electrically conductive manner.

13. The angle sensor arrangement as claimed in claim 4, wherein at least the first band is in the form of a flat band, a film conductor, a strip conductor and/or a flexible film.

14. The use of the angle sensor arrangement as claimed in claim 4 in motor vehicles as a steering angle sensor arrangement.

* * * * *